United States Patent
Kurka et al.

(10) Patent No.: US 12,549,445 B2
(45) Date of Patent: Feb. 10, 2026

(54) USING COMMUNITY DETECTION TO ADDRESS EDGE NETWORK ROBUSTNESS AND RESILIENCE

(71) Applicant: Dell Products L.P., Round Rock, TX (US)

(72) Inventors: David Burth Kurka, Campinas (BR); Diego Vrague Noble, Pelotas (BR); Karen Braga Enes, Belo Horizonte (BR); Thais Luca Marques De Almeida, São Gonçalo (BR); Italo Gomes Santana, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 19 days.

(21) Appl. No.: 18/499,844

(22) Filed: Nov. 1, 2023

(65) Prior Publication Data
US 2025/0141750 A1    May 1, 2025

(51) Int. Cl.
*H04L 41/0894* (2022.01)
*H04L 41/0823* (2022.01)
*H04L 41/12* (2022.01)

(52) U.S. Cl.
CPC .......... *H04L 41/12* (2013.01); *H04L 41/0836* (2013.01); *H04L 41/0894* (2022.05)

(58) Field of Classification Search
CPC .. H04L 41/12; H04L 41/0894; H04L 41/0836
See application file for complete search history.

(56) References Cited

U.S. PATENT DOCUMENTS

| | | | | |
|---|---|---|---|---|
| 8,438,308 | B2 * | 5/2013 | Gan | H04L 41/0663 370/242 |
| 11,888,701 | B1 * | 1/2024 | Liu | H04L 41/12 |
| 2010/0332991 | A1 * | 12/2010 | Banerjee | H04L 41/12 709/224 |
| 2013/0121178 | A1 * | 5/2013 | Mainaud | H04L 43/08 370/252 |
| 2016/0134524 | A1 * | 5/2016 | Beshai | H04L 45/44 370/406 |

(Continued)

*Primary Examiner* — Dhairya A Patel
*Assistant Examiner* — Sujana Khakural
(74) *Attorney, Agent, or Firm* — Krishnendu Gupta; Derek Lam

(57) ABSTRACT

Techniques are disclosed for using community detection to address edge network robustness and resilience. An example system includes at least one processing device including a processor coupled to a memory. The at least one processing device can be configured to implement the following steps: using a community detection algorithm to identify vulnerable communities among edge nodes and inter-community connections between communities detected in an edge network, the edge nodes being grouped into a plurality of communities in the edge network; ranking the communities according to a likelihood of being disconnected due to a network failure; for each ranked community, using the detected inter-community connections to determine a connection policy to create new inter-community connections to neighboring communities; generating a list of connection policies ranked by importance of inter-community connections; and applying at least a subset of the connection policies to the edge network according to the generated list.

17 Claims, 10 Drawing Sheets

(56) References Cited

U.S. PATENT DOCUMENTS

| | | | |
|---|---|---|---|
| 2019/0132224 A1* | 5/2019 | Verma | G06F 18/24 |
| 2019/0190955 A1* | 6/2019 | Khan | H04L 63/20 |
| 2020/0136894 A1* | 4/2020 | Bush | H04L 1/08 |
| 2021/0058314 A1* | 2/2021 | Wilson | H04L 41/145 |
| 2022/0150163 A1* | 5/2022 | Nguyen | H04L 43/16 |
| 2024/0214302 A1* | 6/2024 | Schinkel | H04L 45/125 |

* cited by examiner

USING COMMUNITY DETECTION TO ADDRESS EDGE NETWORK ROBUSTNESS AND RESILIENCE

FIELD

Example embodiments generally relate to edge network management. More specifically, at least some embodiments relate to systems, hardware, software, computer-readable media, and methods for addressing network failures between edge nodes.

BACKGROUND

In edge architecture scenarios, interconnected devices can have access to distinct sources of information (e.g., multi-cloud environment, or sensor networks), and communication between devices is used to enable their synchronization and update. In this context, the way devices are connected (e.g., the network topology) plays an important role in how efficiently information can flow through the system. When analyzing different connection paths in which information travels between devices, the most frequently used connections in these paths are critical to the communication flow as they represent important points of failure of the whole network. Thus, the smaller the number of possible points of failure, the greater the robustness of the network.

SUMMARY

Techniques are disclosed for using community detection to address edge network robustness and resilience.

In an embodiment, a system includes at least one processing device including a processor coupled to a memory. The at least one processing device can be configured to implement the following steps: using a community detection algorithm to identify vulnerable communities among edge nodes and inter-community connections between communities detected in an edge network, the edge nodes being grouped into a plurality of communities in the edge network; ranking the communities according to a likelihood of being disconnected due to a network failure; for each ranked community, using the detected inter-community connections to determine a connection policy to create new inter-community connections to neighboring communities; generating a list of connection policies ranked by importance of inter-community connections; and applying at least a subset of the connection policies to the edge network according to the generated list.

In some embodiments, the at least one processing device is further configured to implement the following steps: using the community detection algorithm to identify communities having low connectivity; identifying inter-community edges that are overloaded; determining a connection policy to create the new inter-community connections in response to a trigger event; determining that the new inter-community connections are sufficient to reconnect the identified communities within a predetermined threshold; and, in response to determining the new inter-community connections are sufficient, applying the connection policy to the edge network. The inter-community edges can be overloaded due to a flow increase. The threshold can be determined based on the new inter-community connections. The threshold can be a minimum count of inter-community connections, a measure of network robustness, or a ratio between a count of intra-community connections and a count of inter-community connections. The steps can be performed in response to the trigger event. The trigger event can be a predetermined number of edge devices joining or leaving the edge network, or a failure of a given inter-community connection. The at least one processing device can be further configured to implement the following steps: using the community detection algorithm to classify edges between edge nodes as inter-community edges or intra-community edges; and ranking the edges according to a connectivity importance measure. The connectivity importance measure can be a betweenness centrality measure for the edges. The communities can be ranked according to a count of inter-community connections for the communities. The connection policy can be configured to create the new inter-community connections by using a structure of the communities to add or remove connections among the communities to increase a robustness of the edge network. The steps can be performed upon a determination that a count of changes in a map of the edge network exceeds a predetermined threshold compared with a previous map of the edge network. The community detection algorithm can be a Girvan-Newman algorithm, a Louvain algorithm, or a Leiden algorithm. The communities can be represented using undirected graphs. The communities can be densely connected. The communities can be assortative. The edge nodes can be edge devices.

Other example embodiments include, without limitation, apparatus, systems, methods, and computer program products comprising processor-readable storage media.

Other aspects will be apparent from the following detailed description and the amended claims.

BRIEF DESCRIPTION OF THE DRAWINGS

The foregoing summary, as well as the following detailed description of exemplary embodiments, will be better understood when read in conjunction with the appended drawings. For the purpose of illustrating the invention, the drawings illustrate embodiments that are presently preferred. It will be appreciated, however, that the invention is not limited to the precise arrangements and instrumentalities shown.

In the drawings.

DETAILED DESCRIPTION

Figure 1:
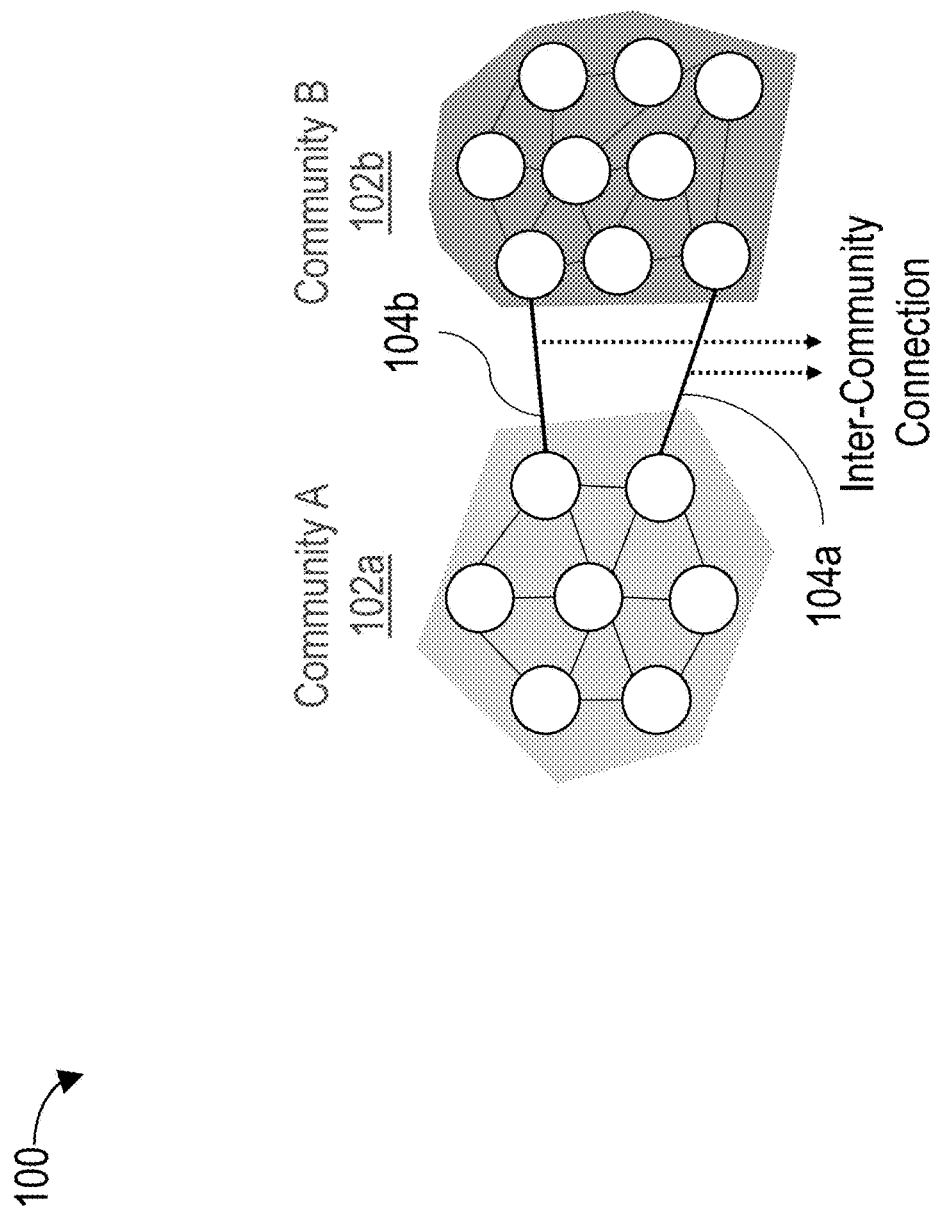
FIGS. 1 and 2 disclose aspects of example communities, in accordance with illustrative embodiments.

Example embodiments generally relate to edge network management. More specifically, at least some embodiments relate to systems, hardware, software, computer-readable media, and methods for addressing network failures between edge nodes.

Disclosed herein are techniques for edge network management. Example embodiments identify critical connections in an edge architecture by inspecting the network topology and dividing the network topology into clusters of devices. In some embodiments these clusters are defined analytically through a community detection algorithm. Device connections are discriminated between intra-community (e.g., connections between devices belonging to the same cluster) and inter-community (e.g., connections between devices belonging to distinct clusters). Special attention is given to the presence or absence of inter-community connections, which are categorized and ranked into different levels of criticality.

Faults can be anticipated and promptly fixed. Example embodiments leverage two complementary approaches to increase reliability and robustness of the network, a proactive and a reactive approach. In the proactive approach, new connections and rewires are proposed on top of an existing topology to prevent imminent failures. In the reactive approach, connection failures are categorized, and their reconnection prioritized allowing a prompt response to minimize network downtime after a failure is identified.

The disclosed techniques address a technical problem of improving resilience and robustness to manage failure in edge architectures. Given an edge architecture system, example embodiments create strategies to first identify their critical connections and then propose structural amendments to the edge architecture's network topology, so that the edge architecture becomes more reliable and robust. Example embodiments determine the best regions to place new connections or to replace old ones while preserving network topology features such as cluster structures and clustering coefficients. This is important to increase the efficiency of communication and, consequently, to reduce the likelihood of network failures and downtimes.

In particular, the present solution addresses technical problems including identifying critical connections in an edge architecture, and anticipating and fixing faults promptly.

High-technology enterprises offer services and devices that are continuously subject to failures in connections. In this sense, advantages of the present solution include reducing failures and improving availability of networks in such edge architecture systems. The present solution also allows delivery of highly resilient and robust edge networks. Any application that displays a network of devices grouped in communities may benefit from the disclosed approaches, without departing from the scope of the embodiments discussed herein.

The following are advantages and technical solutions provided by the present edge network management.

The disclosed techniques provide a framework to improve the edge network's resilience to disruptions and community breakdowns, by applying community detection solutions as a way to identify important or critical connections in an edge network.

The disclosed techniques provide a general procedure that can exploit community information in two ways: a reactive approach and a proactive approach. In some embodiments a system manager can adapt and tune both approaches and decision criteria according to their specific circumstances.

Leveraging community detection in the present edge network intelligent management provides a technical solution to improve network robustness. For example, the disclosed techniques allow network administrators to explore structural network features to make an edge network less prone to failure to end users.

Specific embodiments will now be described in detail with reference to the accompanying figures. In the following detailed description of example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

A. Context for an Example Embodiment

The following is a discussion of a context for example embodiments. This discussion is not intended to limit the scope of the invention, or the applicability of the embodiments, in any way.

The disclosed techniques provide a technical solution operable to improve resilience and robustness.

As used in the context of example embodiments, "resilience" refers to an ability to recover from a disruption. Resilience is, thus, reactive in nature. By way of example and not limitation, resilience can be measured as how fast or how much performance was regained when compared to an original state.

As used in the context of example embodiments, "robustness" refers to strength that something has to sustain its functionality in face of challenges, changes, or disruption. The more robustness, the less the system is affected by attacks. Robustness is, thus, a consequence of proactive measures in anticipation of disruptions.

A.1. Graphs

As used in the context of example embodiments, a "graph" refers to an alternative representation of pairwise mathematical relations. Objects are called vertices and their set is called V. Relations between pairs of objects are called edges and their set is called E. A graph G is the object defined by the tuple (V, E). A graph can also be represented in graphical format. Presuming a set G=(V, E) where V={a, b, c, d}, E={(a, b), (a, c), (d, c), (b, c)}, and that the relationship is asymmetrical, that is, the relationship has no direction between given edges. Then, the graph can be illustrated as vertices V={a, b, c, d} with undirected edges connecting {(a, b), (a, c), (d, c), (b, c)}.

Since relations are fundamental structures in discrete mathematics, graphs can be applied in modeling and solving of real-world problems. Applications range from modelling problems in computer science, logistics, bioinformatics, physics, and the like.

Relationships can be symmetrical, thereby giving a direction to edges. Also, a weight function w:E→$\mathbb{R}$ can be modeled to be an edge feature, such as strength. Nodes can represent more than mere objects, as well. More particularly, the domain in which the graph is being used can define aspects that will be incorporated into the graph. For example, a friendship network could be represented using an asymmetrical graph without weights while a collaboration network might use a symmetrical graph with edge weights.

A graph component is a connected subgraph within a larger graph. A connected subgraph is a graph where every pair of vertices in the subgraph is reachable through a path. A path is a sequence of adjacent edges in a graph that links two or more vertices. Adjacent edges in a graph are edges that share a common vertex.

A.2. Community Detection and Network Robustness

A phenomenon in networks is the emergence of regions of heavily interconnected nodes. These graph clusters are referred to as "communities." More specifically, this kind of community is referred to as an assortative community. Connections can be established in networks using numerous mechanisms. One example mechanism is homophily, which is present whenever a new node in the network prefers to connect to similar nodes according to a criterion. For example, new nodes may form a community in a computer network because they connect to a geographically closer network switch.

As used in the context of example embodiments, "community detection" refers to detecting communities in graph structures. Although select community detection algorithms are discussed herein, any community detection algorithm may be used in connection with the disclosed techniques, without departing from the scope of the embodiments discussed herein. Example algorithms include, but are not limited to, a Girvan-Newman algorithm, a Louvain algorithm, and a Leiden algorithm. The Girvan-Newman algorithm uses a betweenness centrality measure of edges to detect communities. The Girvan-Newman algorithm is described in M. Girvan and M. E. J. Newman, "Sociometry," *Proceedings of the National Academy of Sciences (PNAS)*, pp. 7821-7826 (Jun. 12, 2022). The betweenness centrality measure is described in L. C. Freeman, "A Set of Measures of Centrality Based on Betweenness," *Sociometry*, pp. 35-41 (March 1977). The Louvain algorithm is described in V. D. Blondel, J.-L. Guillaume, R. Lambiotte, et al., "Fast unfolding of communities in large networks," J. STAT. MECH. THEORY EXP. 10008, 6 (2008), https://doi.org/10.1088/1742-5468/2008/10/P10008. The Leiden algorithm is described in V. A. Traag, L. Waltman, and N. J. van Eck, "From Louvain to Leiden: guaranteeing well-connected communities," Nature Scientific Reports 9:5233 (2019). The aforementioned references are each incorporated by reference herein in their entirety, for all purposes. In further embodiments, alternate algorithms can perform community detection in dynamic and heterogeneous networks. For example, the hierarchical clustering family of algorithms can detect hierarchies of communities. Community detection also has applicability to artificial intelligence and machine learning, such as in the context of deep learning techniques.

The community structure of a network, its robustness, and its resilience are three important properties in complex networks. Both network robustness and resilience are investigated within the field of network robustness.

The study of network robustness includes the development of strategies and policies to change topological properties in a graph and the development of metrics to measure and evaluate a network or community robustness. A network that is robust can sustain attacks and failures while keeping its functionality, data communication, performance and so on. Applications include wireless sensor networks, power grids, transportation networks among others.

Most conventional policies that decide whether and how to change a graph to ensure robustness are heuristic in nature. Moreover, most conventional policies are oftentimes supported by a single a posteriori measure together with rounds of simulated attacks or failures. These policies can be grouped into distinct approaches such as model design, edge addition/removal, edge rewiring, and node addition/removal. Model design strategies focus on building networks with specific properties that make them less susceptible to failure or attack. Other approaches may combine two or more techniques.

B. Overview of Aspects of an Example Embodiment

The disclosed edge management techniques operate on assortative communities. As used in the context of example embodiments, the concept of "assortative communities" refers to communities that have a higher number of intra-community connections while having a lower number of inter-community connections. Some embodiments also presume that the network is connected, that is, there is a single connected component (as discussed in section A.1.).

The present edge network management leverages two approaches: a proactive and a reactive one. The proactive step can be a preemptive procedure that runs periodically, for example in constant time intervals, to ensure that the network remains resilient and that all communities have a low probability of being disconnected. The reactive step, in contrast, is triggered in response to a specific situation. This trigger can happen, for example, after a predefined number of new devices joining or leaving the network, or after a failure of a critical inter-community node or connection. Another triggering situation can happen when, due to the edge network's dynamics, a critical network region becomes less connected and suddenly vulnerable to being disconnected.

Example embodiments begin with an initialization phase, followed by proactive and reactive phases, as described in further detail herein.

C. Detailed Description of Aspects of an Example Embodiment

FIG. 1 shows aspects of an example edge network 100 that includes communities 102a, 102b of edge nodes, in accordance with illustrative embodiments. In particular, FIG. 1 illustrates communities 102a, 102b that are connected by inter-community edges 104a, 104b.

The disclosed embodiments may be practiced in an edge environment (sometimes referred to herein as the edge network 100), although this is not required since the disclosed embodiments are not limited to any particular environment.

In example embodiments, the communities 102a, 102b (collectively, 102) generally represent heavily connected edge nodes. In particular, the illustrated communities are assortative. As mentioned, these edge nodes can be represented using a graph. As illustrated, each community includes a densely connected subcomponent. As used in the context of the disclosed embodiments, a "densely connected" community refers to a community whose nodes are densely connected according to an intra-community density metric. Accordingly, there is at least one path available between every pair of nodes in the community.

In example embodiments, the inter-community edges 104a, 104b (collectively, 104) connect the communities 102. In some embodiments, the inter-community edges are high-throughput edges that each connect the communities. Unlike in directed graphs, the inter-community edges have no associated directionality. Further, the number of edges 104 that link one community to another is much lower than the number of internal connections to each community independently.

Figure 2:
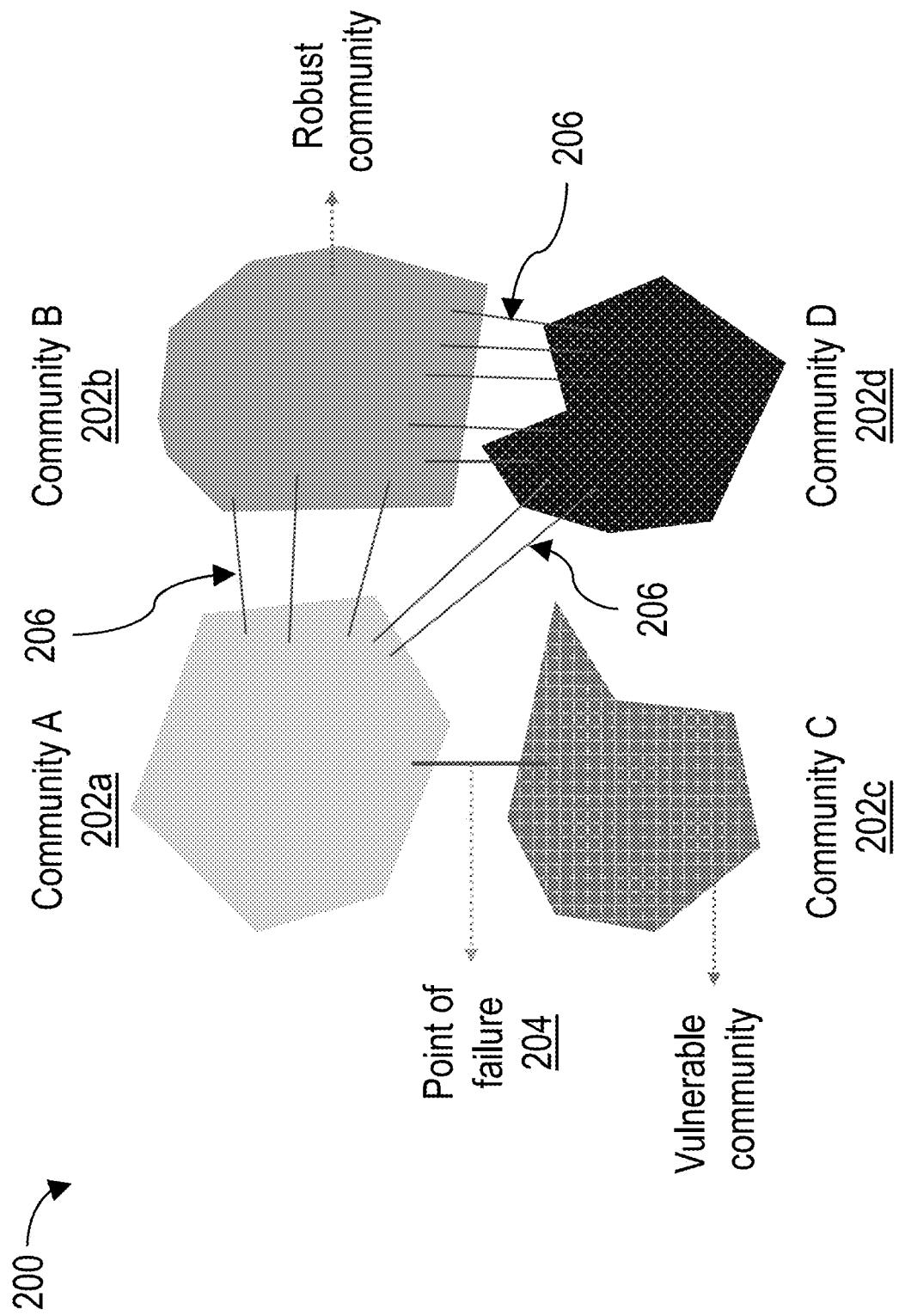

FIG. 2 shows aspects of an example edge network 200 that includes communities 202a, 202b, 202c, 202d, in accordance with illustrative embodiments. Example embodiments are operable in an application scenario that includes a large network of interconnected edge devices with access to different information sources used for updates and synchronization. The illustrated network 200 shows several communities with distinct characteristics.

In particular, the edge network 200 includes communities 202a, 202b, 202c, 202d (collectively, 202). Poorly connected communities, such as Community C 202c, are vulnerable to being disconnected since they have fewer inter-community connections. As used in the context of example embodiments, "poorly connected" communities refer to communities with low inter-community connectivity. They are vulnerable to being disconnected in case of a network failure. Accordingly, these connections are possible points of failure 204 during communication between two communities 202a, 202c.

In contrast, robust communities, such as Community B 202b, are well-connected. Well-connected communities are robust to complete disconnection since the removal of a few edges 206 does not necessarily result in the interruption of communication with all the other communities 202a, 202d.

Figure 3:
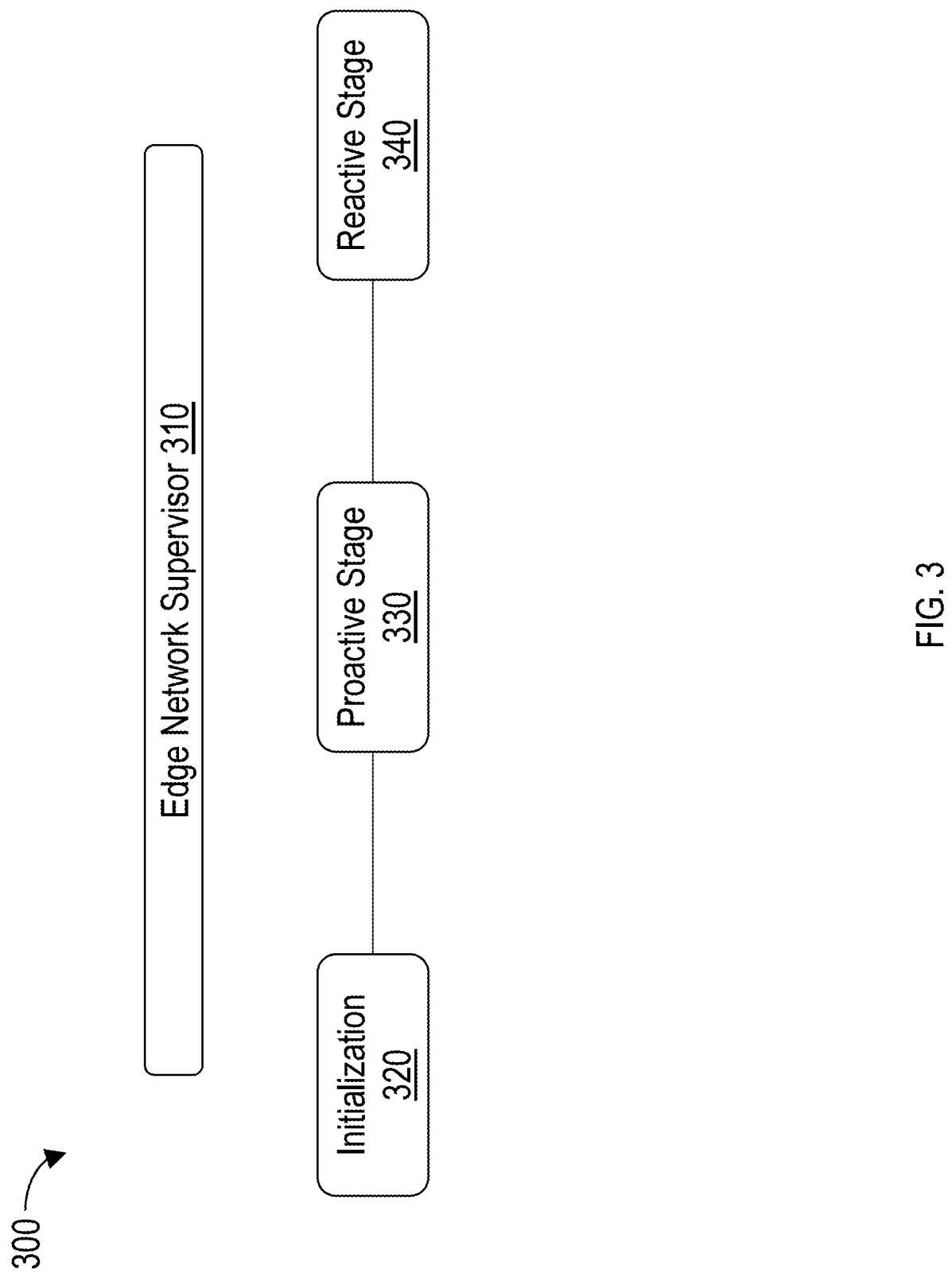
FIGS. 3 and 4 disclose aspects of example overviews of edge network management, in accordance with illustrative embodiments.

FIG. 3 shows aspects of an example overview 300 of edge network management, in accordance with illustrative embodiments. In particular, FIG. 3 illustrates the present edge network management solution configured with an initialization stage 320, a proactive stage 330, and a reactive stage 340.

In example embodiments, the edge network supervisor 310 can implement the disclosed edge network management techniques. As used herein, the term "supervisor" refers to an automated program that is tasked with performing different actions based on input, for example, including the initialization stage 320, the proactive stage 330, and the reactive stage 340. In some implementations, the supervisor is a cloud service operating in a cloud environment. In some implementations, the supervisor is a local service operating on a local device, such as a server. In some implementations, the supervisor is a hybrid service that includes a cloud component operating in the cloud and a local component operating on a local device. These two components can communicate with one another.

Figure 4:
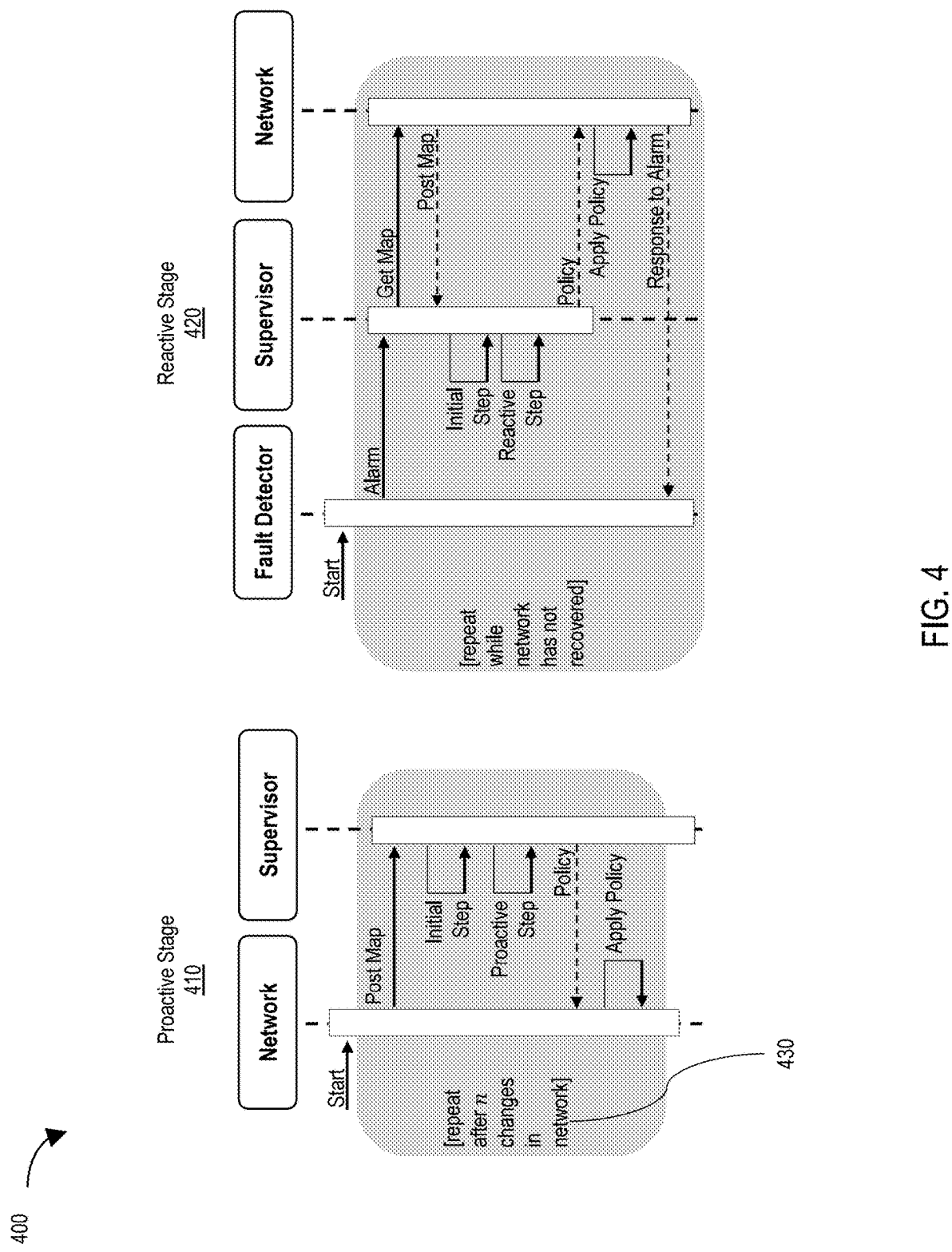

FIG. 4 shows aspects of an example overview 400 of the present edge network management. Example embodiments include a proactive stage 410 and a reactive stage 420 that are applied as circumstances dictate.

Example embodiments begin with a common initialization stage (sometimes referred to herein as an initial step), followed by the proactive stage 410 or the reactive stage 420. In some implementations, the stage that follows the initial step depends on the circumstances. FIG. 4 depicts both scenarios. The proactive and reactive stages each show an example pipeline that is discussed in further detail herein.

In example embodiments of the initialization stage, the present edge network management detects all communities and then ranks all edges according to their relevance.

The proactive stage 410 aims at improving robustness of the edge network robustness before a failure happens. FIG. 4 illustrates an example event 430 to initiate the proactive step, such as starting after n changes in the network. In other embodiments, the proactive stage can be initiated using any other event or combination of events, for example after m minutes, as discussed.

The reactive stage 420 is triggered by an event t and aims at improving network resilience, as discussed in further detail herein.

C.1. Initialization Stage

Figure 5:
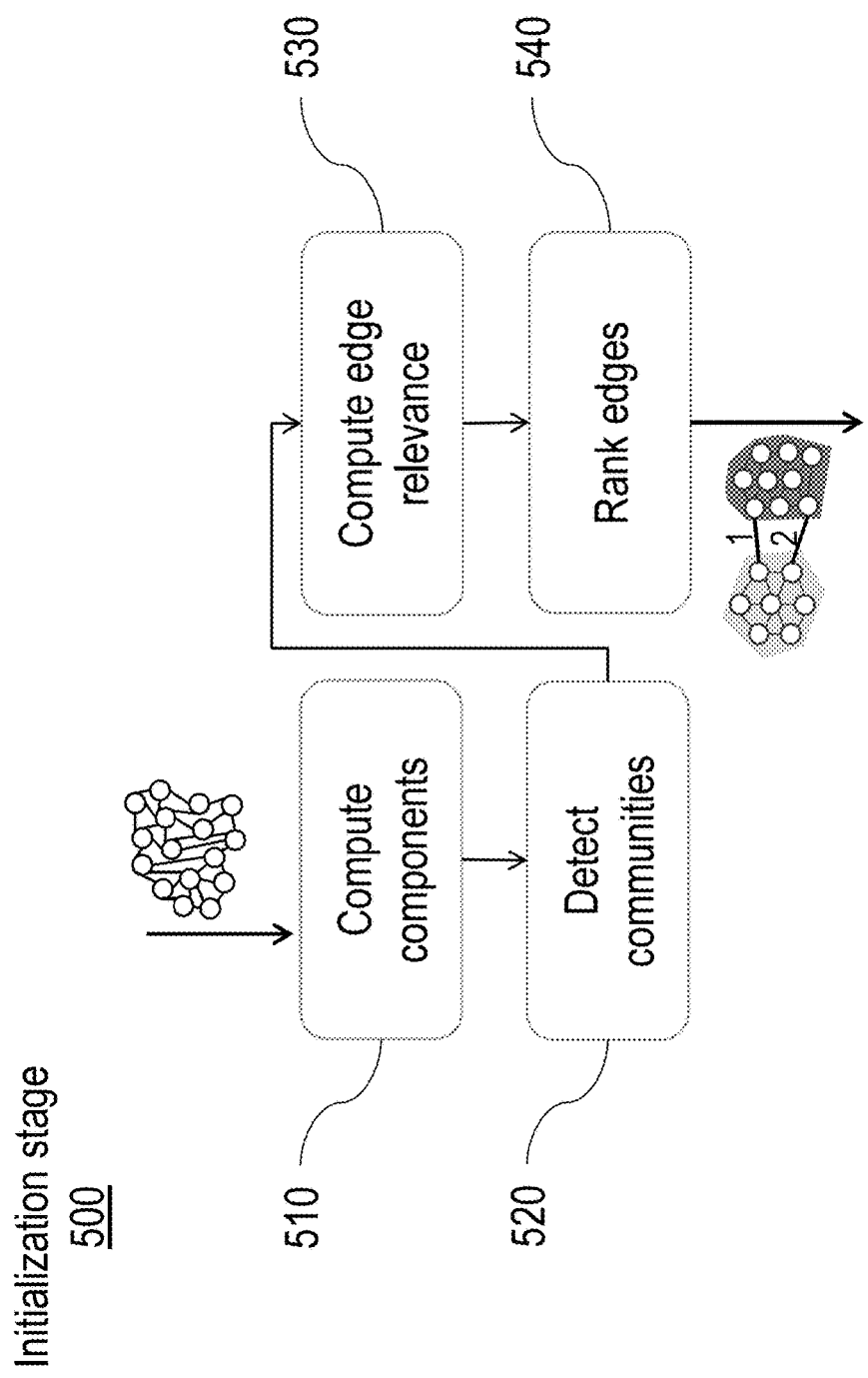
FIG. 5 discloses aspects of an example initialization stage, in accordance with illustrative embodiments.

FIG. 5 illustrates aspects of an example initialization stage 500, in accordance with illustrative embodiments.

In example embodiments, the initialization stage 500 is a common procedure for both the reactive stage and the proactive stage. The initialization stage prepares necessary information and can be performed periodically or as needed, depending on the strategy that is used to guide its execution.

In general, in example embodiments the initialization stage is configured to identify and rank edges using a community detection algorithm.

In example embodiments, the initialization stage 500 includes computing components of the edge network (step 510). In some embodiments, at the beginning of the initialization stage the network supervisor receives the current network map. The network map contains, for example, all nodes, edges and all information associated with such nodes and edges, for the edge network. In further embodiments, the network supervisor tracks previous network maps. For example, this historical data allows the present edge network management to identify, compare, and restore any unwanted change in the current stage of the network.

In example embodiments, the initialization stage 500 includes detecting communities in the edge network (step 520). In some embodiments, a community detection algorithm identifies inter and intra-communities' connections in the edge network. The community detection algorithm allows the present edge network management to identify inter-communities' edges as critical to the connectivity of a community.

In example embodiments, the initialization stage 500 includes computing edge relevance (step 530). Numerous relevance metrics can be employed as appropriate, without departing from the scope of the example embodiments.

In example embodiments, after identifying critical connections that may cause a network failure, the initialization stage 500 ranks the edges (step 540). This allows the disclosed techniques to prioritize which edge should be selected for treatment during the proactive stage, as described in further detail herein. Numerous ranking metrics can be employed as appropriate, without departing from the scope of the example embodiments. By way of example and not limitation, edge betweenness centrality is one example ranking metric to determine whether an edge is critical.

In some implementations, in the beginning initialization stages 500, such as following the first edge ranking, the proactive stage can be applied to create or rewire as many connections as possible, based on the initial rank from the initialization stage. Subsequently, the proactive stage can be applied only after a predefined number n of changes in the network. As for the reactive stage, in some embodiments the initialization stage occurs after the edge network supervisor receives an alarm of fault connection, for example from the fault detector.

C.2. Proactive Stage

Figure 6:
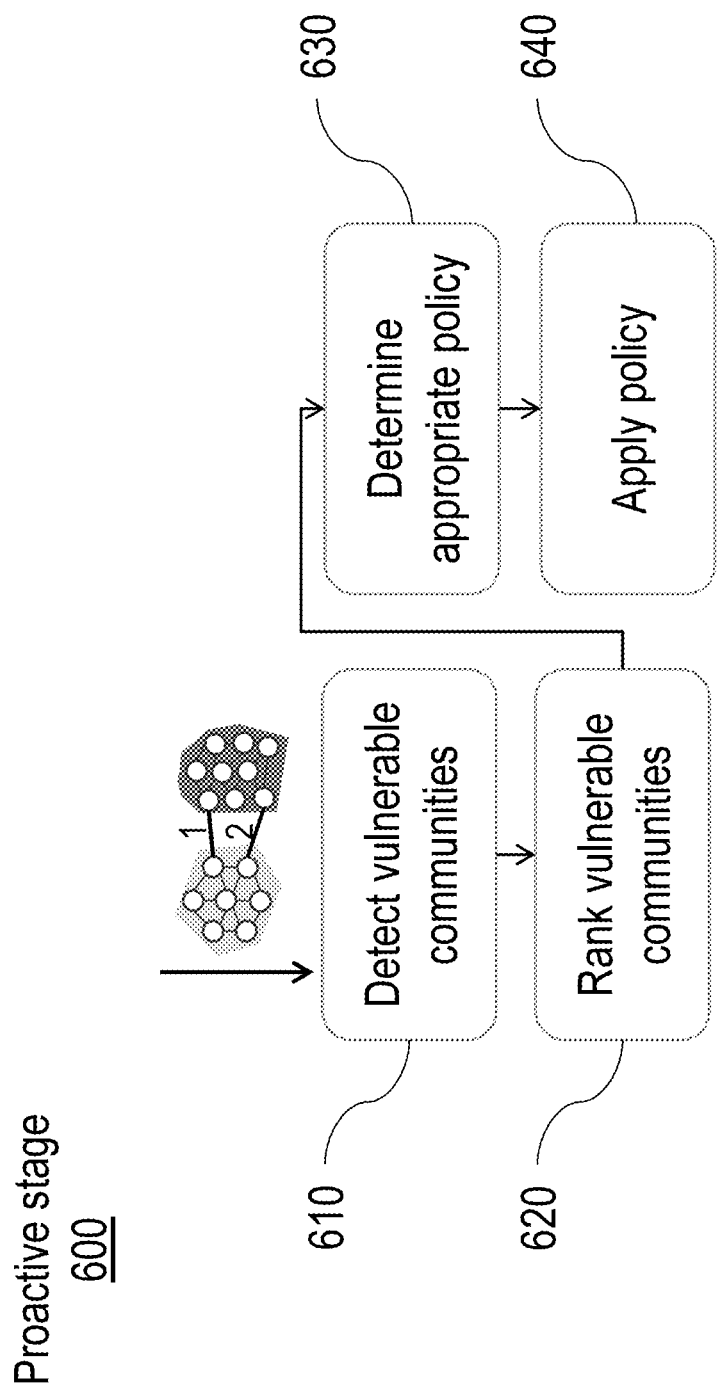
FIG. 6 discloses aspects of an example proactive stage, in accordance with illustrative embodiments.

FIG. 6 shows aspects of an example proactive stage 600, in accordance with illustrative embodiments.

In example embodiments, the proactive stage 600 (an example of the proactive stages 330, 410) represents a preemptive procedure that runs periodically, in some implementations in constant time intervals, to ensure that the edge network remains resilient and that all communities have a low probability of being disconnected.

In example embodiments, the proactive stage 600 includes detecting vulnerable communities (step 610). In some implementations the vulnerable communities are detecting based on the ranking of edges provided by the central server from the initialization stage and based on network centrality metrics such as betweenness that may be available in the edge network. In the proactive stage, the present edge network management seeks to identify vulnerable communities, while in the initialization stage the disclosed techniques were interested in identifying vulnerable edges.

In example embodiments, the proactive stage 600 includes ranking vulnerable communities in the edge network (step 620). In some implementations, in the next step the present edge network management is configured to label inter-communities connections in order to keep track of the connections and prevent communities from getting isolated. By doing this tracking, the disclosed edge network management is able to create a ranking of communities that are vulnerable to being disconnected in the event of a network failure. In some embodiments, the vulnerable community ranking is determined by counting the number of inter-communities' connections for all communities and sorting the connections in descending order. This results in the most vulnerable communities being at the top of the ranking. In further embodiments, to better define vulnerable communities, a threshold can be defined, for example according to the number of inter-connections to classify each community as vulnerable or not.

In example embodiments, the proactive stage 600 includes determining a community policy for the edge network (step 630). In some implementations, after creation of the ranking, the present edge network management defines an appropriate policy for the creation of a new connection that decreases the vulnerability of the community. As used in the context of example embodiments, a "policy" can refer to any heuristic that changes the graph of the edge network through rewiring or edge addition/removal to increase the network's robustness. It is appreciated that there are heuristics that do not take the communities' structures into account, but such heuristics would not be the recommended policies in this step. It is also appreciated that distinct contexts may benefit from distinct policies and there is not a "best" policy for all contexts.

In example embodiments, the proactive stage 600 includes applying the community policy to the edge network (step 640). Next, the proactive stage returns the chosen community policies, for example ordered by the most critical connections to be performed by the edge network.

Figure 7:
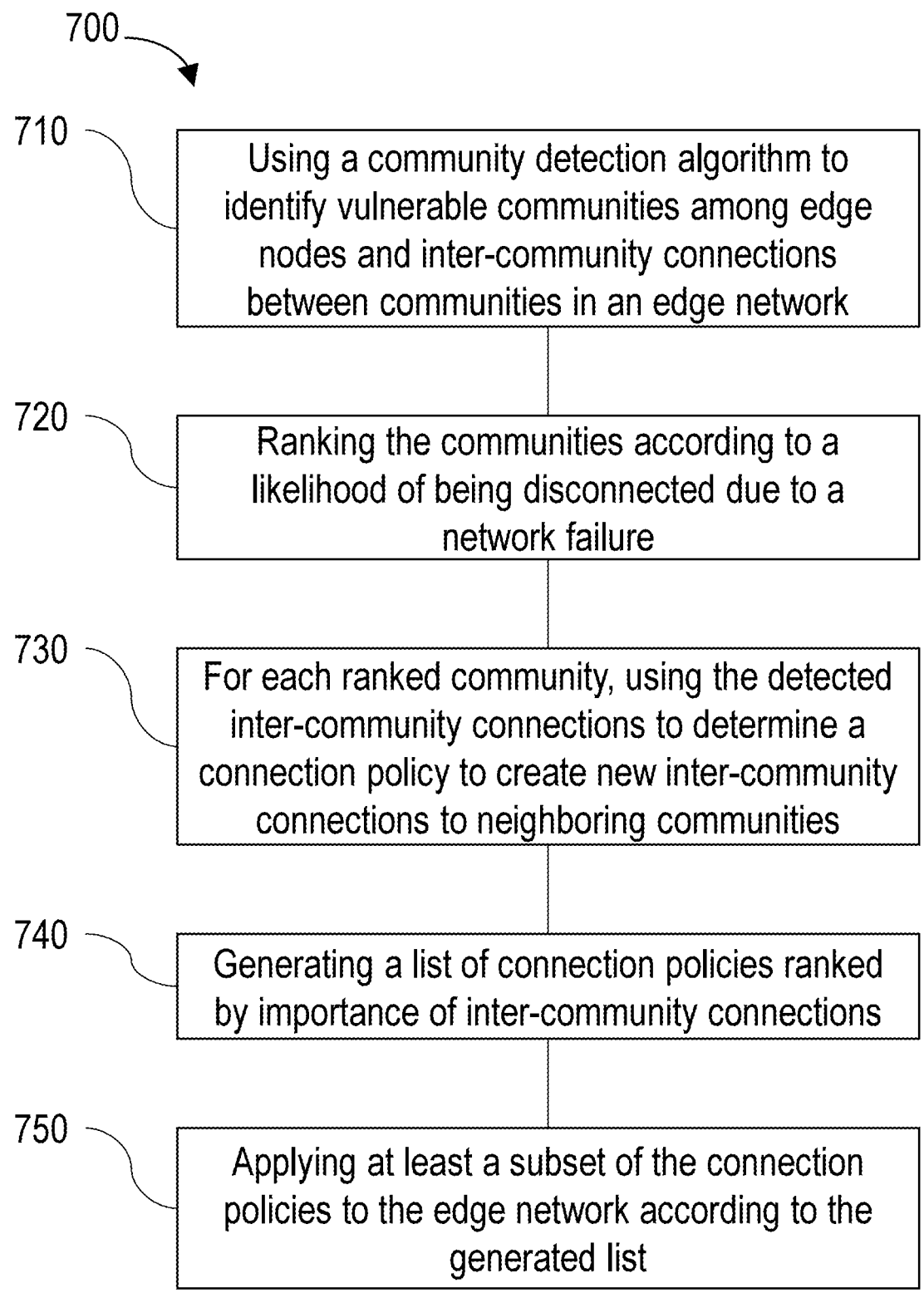
FIG. 7 discloses a flowchart of an example method, in accordance with illustrative embodiments.

FIG. 7 shows a flowchart of an example method 700, in accordance with illustrative embodiments. In example embodiments, the method 700 allows for managing edge networks.

In some implementations, the method 700 can be performed by the present edge network management, such as using the supervisor 310.

In example embodiments, the method 700 includes using a community detection algorithm to identify vulnerable communities among edge nodes and inter-community connections between communities in an edge network (step 710). The edge nodes can be grouped into a plurality of communities in the edge network. In some embodiments, the community detection algorithm is a Girvan-Newman algorithm, a Louvain algorithm, or a Leiden algorithm. In some implementations, the communities are represented using undirected graphs. In some embodiments, the communities are densely connected. In some implementations, the communities are assortative. In some implementations, the edge nodes are edge devices.

In example embodiments, the method 700 includes ranking the communities according to a likelihood of being disconnected due to a network failure (step 720). In some embodiments, the communities are ranked according to a count of inter-community connections for the communities.

In example embodiments, the method 700 includes, for each ranked community, using the detected inter-community connections to determine a connection policy to create new inter-community connections to neighboring communities (step 730). In some embodiments, the connection policy is configured to create the new inter-community connections by using a structure of the communities to add or remove connections among the communities to increase a robustness of the edge network.

In example embodiments, the method 700 includes generating a list of connection policies ranked by importance of inter-community connections (step 740). In some embodiments, the connection policy can be a heuristic that changes the graph of the edge network through rewiring, or adding or removing edges to increase the robustness of the edge network.

In example embodiments, the method 700 includes applying at least a subset of the connection policies to the edge network according to the generated list (step 750).

In some embodiments, the method 700 includes performing the steps 710, 720, 730, 740, 750 upon a determination that a count of changes in a map of the edge network exceeds a predetermined threshold compared with a previous map of the edge network.

In some embodiments, the method 700 further includes using the community detection algorithm to classify edges between edge nodes as inter-community edges or intra-community edges, and ranking the edges according to a connectivity importance measure. In further embodiments, the connectivity importance measure is a betweenness centrality measure for the edges.

C.3. Reactive Stage

Figure 8:
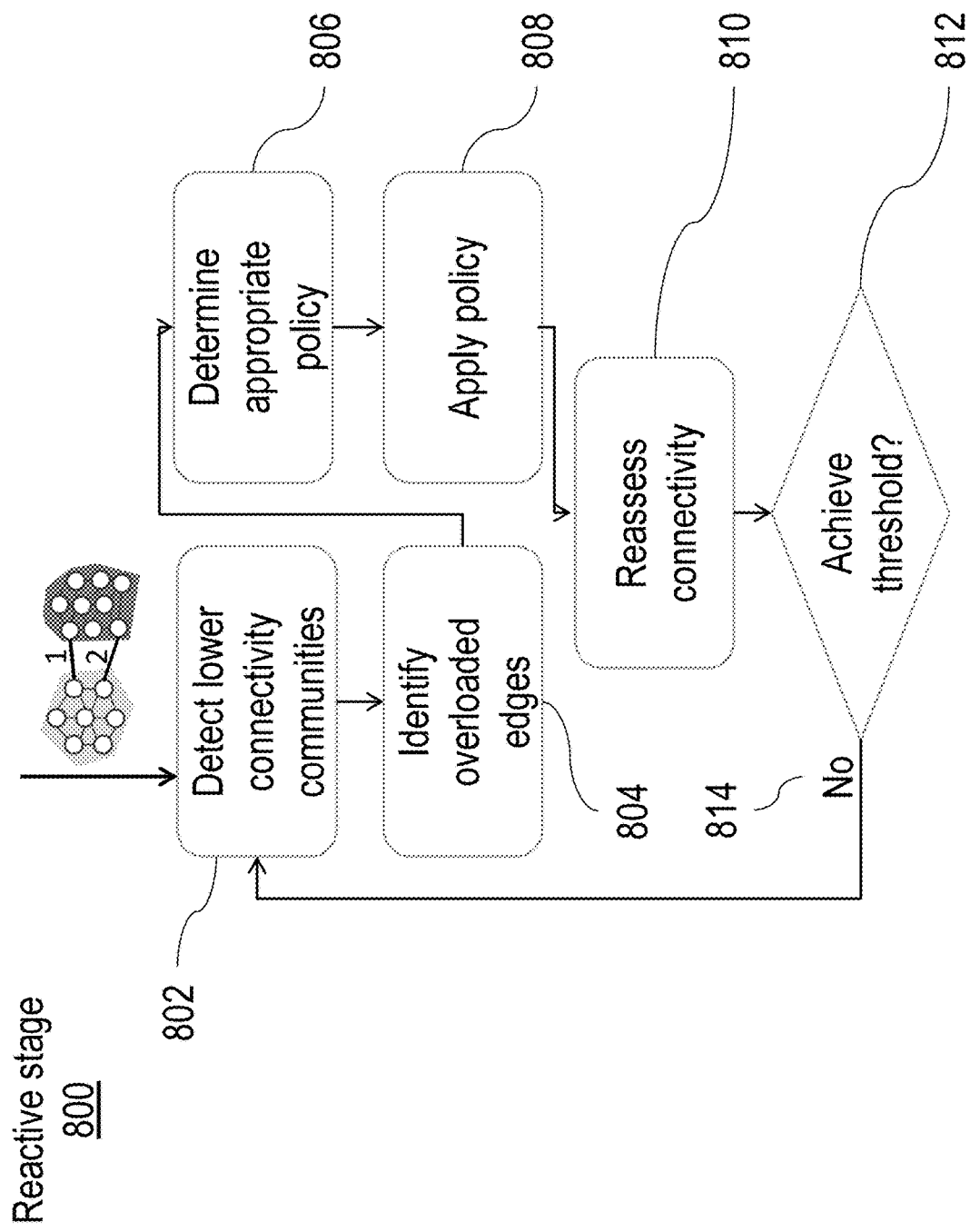
FIG. 8 discloses aspects of an example reactive stage, in accordance with illustrative embodiments.

FIG. 8 shows aspects of an example reactive stage 800, in accordance with illustrative embodiments.

In example embodiments, the reactive stage 800 (an example of the reactive stages 340, 420), unlike the proactive stage, is triggered in response to a specific situation. In some implementations this situation can be triggered, for example, after a predefined number of edge devices have joined or left the edge network, or after a failure of a critical inter-community connection. In further embodiments, another triggering situation can be when, due to the edge network's dynamics, a critical network region becomes naturally less connected and suddenly vulnerable to being disconnected.

In example embodiments, the reactive stage 800 includes detecting lower connectivity communities (step 802). After the reactive stage is activated by the trigger event t, the disclosed techniques detect one or more communities that have lower connectivity.

In example embodiments, the reactive stage 800 includes identifying overloaded edges (step 804). Some implementations of the present edge network management identify which inter-community edges become overloaded, for example due to any sudden flow increase.

In example embodiments, the reactive stage 800 includes determining a community policy (step 806). In some implementations, the present edge network management next determines which community policy is appropriate to create one or more new inter-community connections according to the activated trigger.

In example embodiments, the reactive stage 800 includes applying the community policy to the edge network (step 808). In some implementations, after determining the best policy, the disclosed techniques apply the identified policy and create the needed connections.

In example embodiments, the reactive stage 800 includes reassessing connectivity in the edge network (step 810). In some implementations, the next step includes reassessing connectivity among all communities in the edge network.

In example embodiments, the reactive stage 800 includes evaluating whether a predetermined threshold has been achieved (step 812). In some implementations, after the reconnection, the present edge network management tests if the new connections were sufficient to reconnect the communities within a predetermined threshold, such as a safety threshold. In some embodiments, the safety threshold is a predefined parameter to measure the reconnections made by the reactive stage. This parameter can be, for example, a ratio between the number of intra-community connections and inter-community connections. In alternate embodiments, the threshold may be a minimum number of inter-community connections, a combination of more complex network robustness metrics, or the like.

In example embodiments, the reactive stage 800 includes, upon a determination that the threshold has not been achieved (step 814), returning to the beginning to monitor the edge network. In some implementations, if the threshold is not satisfied, then the disclosed techniques rerun the reactive stage. Otherwise, the present edge network management returns to the initialization stage.

Figure 9:
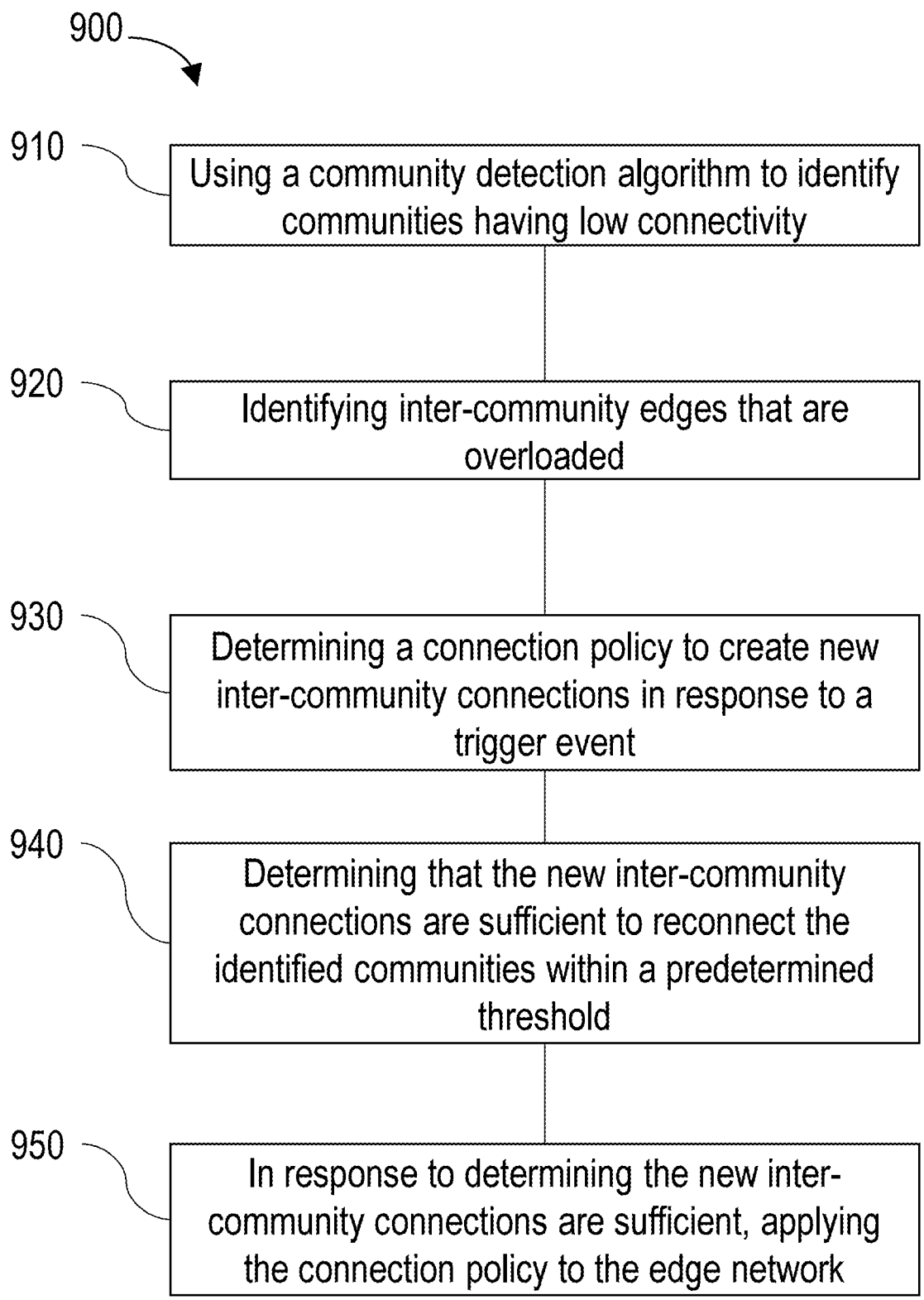
FIG. 9 discloses a flowchart of an example method, in accordance with illustrative embodiments.

FIG. 9 shows a flowchart of an example method 900, in accordance with illustrative embodiments. In example embodiments, the method 900 allows for managing edge networks.

In some embodiments, the method 900 can be performed by the present edge network management, such as using the supervisor 310.

In example embodiments, the method 900 includes using the community detection algorithm to identify communities having low connectivity (step 910).

In example embodiments, the method 900 includes identifying inter-community edges that are overloaded (step 920). In some embodiments, the inter-community edges are overloaded due to a flow increase.

In example embodiments, the method 900 includes determining a connection policy to create the new inter-community connections in response to a trigger event (step 930). In some embodiments, the trigger event is a predetermined number of edge devices joining or leaving the edge network, or a failure of a given inter-community connection.

In example embodiments, the method 900 includes determining that the new inter-community connections are sufficient to reconnect the identified communities within a predetermined threshold (step 940). In some embodiments, the threshold is determined based on the new inter-community connections. In some embodiments, the threshold is a minimum count of inter-community connections, a measure of network robustness, or a ratio between a count of intra-community connections and a count of inter-community connections.

In example embodiments, the method 900 includes, in response to determining the new inter-community connections are sufficient, applying the connection policy to the edge network (step 950).

In some embodiments, the method 900 includes performing the steps 910, 920, 930, 940, 950 in response to the trigger event.

In some embodiments, the method 900 further includes using the community detection algorithm to classify edges between edge nodes as inter-community edges or intra-community edges, and ranking the edges according to a connectivity importance measure. In further embodiments, the connectivity importance measure is a betweenness centrality measure for the edges.

D. Example Methods

While the various steps in the example methods 500, 600, 700, 800, 900 have been presented and described sequentially, one of ordinary skill in the art, having the benefit of this disclosure, will appreciate that some or all of the steps may be executed in different orders, that some or all of the steps may be combined or omitted, and/or that some or all of the steps may be executed in parallel.

It is noted with respect to the example methods 500, 600, 700, 800, 900 that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

At least portions of the present edge network management can be implemented using one or more processing platforms. Such a processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionalities within the present edge network management. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIG. 10. Although described in the context of the present edge network management system, these platforms may also be used to implement at least portions of other information processing systems in other embodiments.

Figure 10:
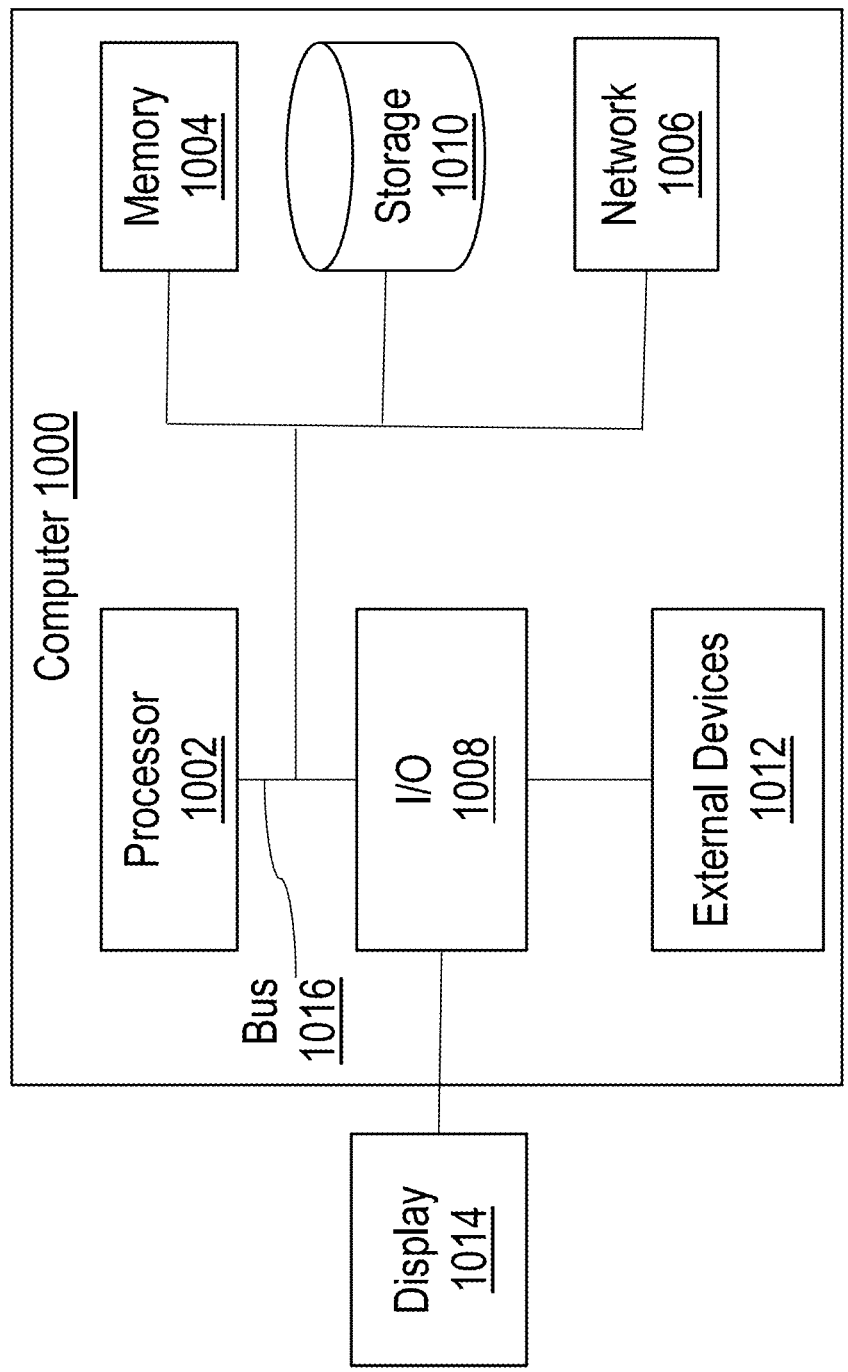
FIG. 10 discloses aspects of a computing entity configured and operable to perform any of the disclosed methods, processes, and operations, in accordance with illustrative embodiments.

FIG. 10 illustrates aspects of a computing device or a computing system in accordance with example embodiments. The computer 1000 is shown in the form of a general-purpose computing device. Components of the computer may include, but are not limited to, one or more processors or processing units 1002, a memory 1004, a network interface 1006, and a bus 1016 that communicatively couples various system components including the system memory and the network interface to the processor.

The bus 1016 represents one or more of any of several types of bus structures, including a memory bus or memory controller, a peripheral bus, an accelerated graphics port, and a processor or local bus using any of a variety of bus architectures. By way of non-limiting example, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer 1000 typically includes a variety of computer-readable media. Such media may be any available media that is accessible by the computer system, and such media includes both volatile and non-volatile media, removable and non-removable media.

The memory 1004 may include computer system readable media in the form of volatile memory, such as random-access memory (RAM) and/or cache memory. The computer system may further include other removable/non-removable, volatile/non-volatile computer system storage media. By way of example only, the storage system 1010 may be provided for reading from and writing to a non-removable, non-volatile magnetic media (not shown and typically called a "hard drive") in accordance with the present edge network management techniques. Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media may be provided. In such instances, each may be connected to the bus 1016 by one or more data media interfaces. As has been depicted and described above in connection with FIGS. 1-9, the memory may include at least one computer program product having a set (e.g., at least one) of program modules that are configured to carry out the functions of the embodiments as described herein.

The computer 1000 may also include a program/utility, having a set (at least one) of program modules, which may be stored in the memory 1004 by way of non-limiting example, as well as an operating system, one or more application programs, other program modules, and program data. Each of the operating system, one or more application programs, other program modules, and program data or some combination thereof, may include an implementation of a networking environment. The program modules generally carry out the functions and/or methodologies of the embodiments as described herein.

The computer 1000 may also communicate with one or more external devices 1012 such as a keyboard, a pointing device, a display 1014, etc.; one or more devices that enable a user to interact with the computer system; and/or any devices (e.g., network card, modem, etc.) that enable the computer system to communicate with one or more other computing devices. Such communication may occur via the Input/Output (I/O) interfaces 1008. Still yet, the computer system may communicate with one or more networks such as a local area network (LAN), a general wide area network (WAN), and/or a public network (e.g., the Internet) via the network adapter 1006. As depicted, the network adapter communicates with the other components of the computer system via the bus 1016. It should be understood that although not shown, other hardware and/or software components could be used in conjunction with the computer system. Non-limiting examples include microcode, device drivers, redundant processing units, external disk drive arrays, RAID systems, tape drives, data archival storage systems, and the like.

It is noted that embodiments of the invention, whether claimed or not, cannot be performed, practically or otherwise, in the mind of a human. Accordingly, nothing herein should be construed as teaching or suggesting that any aspect of any embodiment could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

In the foregoing description of FIGS. 1-10, any component described with regard to a figure, in various embodiments of the invention, may be equivalent to one or more like-named components described with regard to any other figure. For brevity, descriptions of these components have not been repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the disclosure, ordinal numbers (e.g., first, second, third, etc.) may have been used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

Throughout this disclosure, elements of figures may be labeled as "a" to "n". As used herein, the aforementioned labeling means that the element may include any number of items and does not require that the element include the same number of elements as any other item labeled as "a" to "n." For example, a data structure may include a first element labeled as "a" and a second element labeled as "n." This labeling convention means that the data structure may include any number of the elements. A second data structure, also labeled as "a" to "n," may also include any number of elements. The number of elements of the first data structure and the number of elements of the second data structure may be the same or different.

While the invention has been described with respect to a limited number of embodiments, those of ordinary skill in the art, having the benefit of this disclosure, will appreciate that other embodiments can be devised that do not depart from the scope of the invention as disclosed herein. Accordingly, the scope of the embodiments described herein should be limited only by the appended claims.

What is claimed is:

1. A system comprising:
   at least one processing device including a processor coupled to a memory;
   the at least one processing device being configured to implement the following steps:
   using a community detection algorithm and network centrality metrics to identify vulnerable communities among edge nodes and inter-community connections between communities detected in an edge network, the edge nodes being grouped into a plurality of communities in the edge network, the community detection algorithm including a Louvain algorithm or a Leiden algorithm;
   using a count of inter-community connections for the communities and a measure of network robustness to rank the communities according to a likelihood of being disconnected due to a network failure;
   for each ranked community, using the detected inter-community connections to determine a connection policy to create new inter-community connections to neighboring communities;
   generating a list of connection policies ranked by importance of inter-community connections;
   applying at least a subset of the connection policies to the edge network according to the generated list;
   using the community detection algorithm to identify communities having low connectivity:
   identifying inter-community edges that are overloaded;
   determining a connection policy to create the new inter-community connections in response to a trigger event;
   determining that the new inter-community connections are sufficient to reconnect the identified communities within a predetermined threshold, the threshold being a ratio between a count of intra-community connections and a count of inter-community connections; and
   in response to determining the new inter-community connections are sufficient, applying the connection policy to the edge network.

2. The system of claim 1, wherein the inter-community edges are overloaded due to a flow increase.

3. The system of claim 1, wherein the threshold is determined based on the new inter-community connections.

4. The system of claim 1, wherein the threshold is a minimum count of inter-community connections.

5. The system of claim 1, wherein the steps are performed in response to the trigger event.

6. The system of claim 1, wherein the trigger event is a predetermined number of edge devices joining or leaving the edge network.

7. The system of claim 1, wherein the at least one processing device is further configured to implement the following steps:
   using the community detection algorithm to classify edges between edge nodes as inter-community edges or intra-community edges; and
   ranking the edges according to a connectivity importance measure.

8. The system of claim 7, wherein the connectivity importance measure is a betweenness centrality measure for the edges.

9. The system of claim 1, wherein the connection policy is configured to create the new inter-community connections by using a structure of the communities to add or remove connections among the communities to increase a robustness of the edge network.

10. The system of claim 1, wherein the steps are performed upon a determination that a count of changes in a map of the edge network exceeds a predetermined threshold compared with a previous map of the edge network.

11. The system of claim 1, wherein the communities are represented using undirected graphs.

12. The system of claim 1, wherein the communities are densely connected.

13. The system of claim 1, wherein the communities are assortative.

14. The system of claim 1, wherein the edge nodes are edge devices.

15. A method comprising:
    using a community detection algorithm and network centrality metrics to identify vulnerable communities among edge nodes and inter-community connections between communities detected in an edge network, the edge nodes being grouped into a plurality of communities in the edge network, the community detection algorithm including a Louvain algorithm or a Leiden algorithm;
    using a count of inter-community connections for the communities and a measure of network robustness to rank the communities according to a likelihood of being disconnected due to a network failure;
    for each ranked community, using the detected inter-community connections to determine a connection policy to create new inter-community connections to neighboring communities;
    generating a list of connection policies ranked by importance of inter-community connections;
    applying at least a subset of the connection policies to the edge network according to the generated list;
    using the community detection algorithm to identify communities having low connectivity;
    identifying inter-community edges that are overloaded;
    determining a connection policy to create the new inter-community connections in response to a trigger event;
    determining that the new inter-community connections are sufficient to reconnect the identified communities within a predetermined threshold, the threshold being a ratio between a count of intra-community connections and a count of inter-community connections; and in response to determining the new inter-community connections are sufficient, applying the connection policy to the edge network.

16. The method of claim 15, wherein the likelihood of being disconnected due to the network failure is determined using a vulnerability score for each community, and wherein the vulnerability score is determined based on the count of inter-community connections and on the measure of network robustness.

17. A non-transitory processor-readable storage medium having stored thereon program code of one or more software programs, wherein the program code when executed by at least one processing device causes the at least one processing device to perform the following steps:

using a community detection algorithm and network centrality metrics to identify vulnerable communities among edge nodes and inter-community connections between communities detected in an edge network, the edge nodes being grouped into a plurality of communities in the edge network, the community detection algorithm including a Louvain algorithm or a Leiden algorithm;

using a count of inter-community connections for the communities and a measure of network robustness to rank the communities according to a likelihood of being disconnected due to a network failure;

for each ranked community, using the detected inter-community connections to determine a connection policy to create new inter-community connections to neighboring communities;

generating a list of connection policies ranked by importance of inter-community connections;

applying at least a subset of the connection policies to the edge network according to the generated list;

using the community detection algorithm to identify communities having low connectivity;

identifying inter-community edges that are overloaded;

determining a connection policy to create the new inter-community connections in response to a trigger event;

determining that the new inter-community connections are sufficient to reconnect the identified communities within a predetermined threshold, the threshold being a ratio between a count of intra-community connections and a count of inter-community connections; and in response to determining the new inter-community connections are sufficient, applying the connection policy to the edge network.

\* \* \* \* \*